United States Patent
Heuer et al.

(10) Patent No.: US 7,208,564 B2
(45) Date of Patent: *Apr. 24, 2007

(54) BRANCHED POLYFORMALS AND COPOLYFORMALS THEIR PREPARATION AND USE

(75) Inventors: Helmut-Werner Heuer, Krefeld (DE); Rolf Wehrmann, Krefeld (DE); Heiner Onckels, Krefeld (DE)

(73) Assignee: Bayer Materialscience AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/924,620

(22) Filed: Aug. 24, 2004

(65) Prior Publication Data
US 2005/0049389 A1 Mar. 3, 2005

(30) Foreign Application Priority Data
Aug. 27, 2003 (DE) .................. 103 39 357

(51) Int. Cl.
*C08G 64/00* (2006.01)
(52) U.S. Cl. .................. 528/196; 264/176.1; 264/219; 359/642; 528/126; 528/174; 528/198; 528/205; 528/219
(58) Field of Classification Search ............. 264/176.1, 264/219; 359/642; 528/126, 174, 196, 198, 528/205, 219
See application file for complete search history.

(56) References Cited

U.S. PATENT DOCUMENTS

| | | | | |
|---|---|---|---|---|
| 3,337,507 A | * | 8/1967 | Gutweiler et al. | 528/249 |
| 4,260,733 A | * | 4/1981 | Loucks et al. | 528/219 |
| 4,346,290 A | * | 8/1982 | Rossi | 235/436 |
| 4,356,290 A | | 10/1982 | White | 525/397 |
| 4,374,974 A | | 2/1983 | Hay | 528/219 |
| 4,801,679 A | * | 1/1989 | Shigematsu et al. | 528/219 |
| 6,528,612 B1 | * | 3/2003 | Brenner et al. | 528/271 |

FOREIGN PATENT DOCUMENTS

| | | |
|---|---|---|
| CA | 1117247 | 1/1982 |
| CA | 1117249 | 1/1982 |
| JP | 407238214 | * 3/1994 |

OTHER PUBLICATIONS

Patent Abstracts of Japan Bd. 0143, Nr. 42 (C-0743), Jul. 24, 1990 & JP 2 124935 A (Idemitsu Kosan Co Ltd), May. 14, 1990.

* cited by examiner

*Primary Examiner*—Terressa Boykin
(74) *Attorney, Agent, or Firm*—Joseph C. Gil; Aron Preis

(57) ABSTRACT

A branched (co)polyformal is disclosed. The (co)polyformal contains structural units conforming to at least one the general formulae (1a) and (1b)

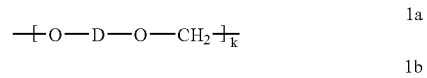

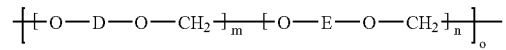

wherein each of -E- and -D- independently of one another denote an aromatic radical having 6 to 40 C atoms, k is 1 to 4,000, o is 1 to 4,000, m is z/o and n is (o-z)/o, where z is 0 to o.

The branched (co)polyformal is characterized by its reduced water uptake and improved hydrolytic stability. Also disclosed are processes for its preparation and use in the production of molded articles.

9 Claims, No Drawings

BRANCHED POLYFORMALS AND COPOLYFORMALS THEIR PREPARATION AND USE

FIELD OF THE INVENTION

The present invention relates to thermoplastic molding compositions and in particulars to branched polyformals and copolyformals.

SUMMARY OF THE INVENTION

A branched (co)polyformal is disclosed. The (co)polyformal contains structural units conforming to at least one the general formulae (1a) and (1b)

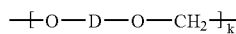

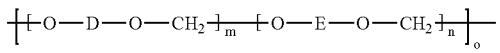

wherein each of -E- and -D- independently of one another denote an aromatic radical having 6 to 40 C atoms, k is 1 to 4,000, o is 1 to 4,000, m is z/o and n is (o-z)/o, where z is 0 to o. The branched (co)polyformal is characterized by its reduced water uptake and improved hydrolytic stability. Also disclosed are processes for its preparation and its use in the production of molded articles.

BACKGROUND OF THE INVENTION

Aromatic polycarbonates belong to the group of industrial thermoplastics. They are distinguished by the combination of the technologically important properties of transparency, heat resistance and toughness. To obtain high molecular weight linear polycarbonates by the phase boundary process, the alkali metal salts of bisphenols are reacted with phosgene in the two-phase mixture. The molecular weight may be controlled by the amount of monophenols, such as e.g. phenol or tert-butylphenol. Practically exclusively linear polymers are formed in these reactions. This may be demonstrated by end group analysis.

Aromatic polycarbonates based on bisphenol A are also used in particular for the production of optical data carriers. However, they may also absorb up to 0.34 wt. % of water, which may have an adverse effect on the dimensional stability of data carrier materials. For other uses, in particular external uses, the hydrolysis again represents a certain problem.

U.S. Pat. No. 4,185,009, DE A 25 00 092 and JP B 79039040 describe a process in which, starting from mixtures of specific bisphenols with chain terminators and isatin-bisphenols as a branching agent, branched high molecular weight polycarbonates may be obtained after reaction with phosgene in a phase boundary reaction. DE A 42 40 313 describes copolycarbonates of improved flowability based on bisphenol A and bisphenol TMC with isatin-biscresol (IBC) as a branching agent.

DE A 19 913 533 describes highly branched polycarbonates, for the preparation of which oligomeric or polymeric branching agents are employed. DE A 19 943 642 describes branched polycarbonates which, because of their structural viscosity, are suitable for use as water bottle material.

U.S. Pat. No. 5,367,044 describes bottles molded of branched polycarbonate in which 1,1,1-tris-(4-hydroxyphenyl)ethane (THPE) is employed as a branching agent in amounts of 0.28–0.36 mol %.

Because of their better flowability compared with linear polycarbonates, branched polycarbonates are of particular interest for uses in which a good flow of the polymer melt at relatively high shear rates is desirable, i.e. for example in injection molding of complex structures. Branched polycarbonates are distinguished by structural viscosity and may no longer be regarded as Newtonian fluids.

However, these materials known from the prior art show unsatisfactory properties in respect of their resistance to hydrolysis and UV, attempts being made to improve these by expensive and costly additive measures.

A branched, ideally structurally viscous material which at the same time is distinguished by an improved resistance to hydrolysis and/or UV would therefore be desirable.

On the basis of the prior art, there has therefore for a long time been the object of discovering a material which has the typical advantages of polycarbonate as an industrial thermoplastic, but without having the disadvantages mentioned.

It has now been found, surprisingly, that certain branched polyformals and copolyformals are such materials.

Aromatic polyformals are also transparent thermoplastics which are built up from bisphenol units. In contrast to polycarbonates, however, the linking element between the bisphenol units consists not of carbonate units but include complete acetal units. While phosgene is the source of carbonate for the linking in polycarbonate, in polyformals e.g. methylene chloride or α,α-dichlorotoluene assumes the function of the source of the complete acetal linking element during the polycondensation. Polyformals may therefore also be regarded as polyacetals.

In contrast to polycarbonate, the preparation of aromatic polyformals may take place in a homogeneous phase from bisphenols and methylene chloride in the presence of alkali metal hydroxides. In this polycondensation methylene chloride simultaneously functions as a reactant and as a solvent. As in the polycondensation of polycarbonate, the molecular weight may also be controlled by small amounts of monophenol.

U.S. Pat. No. 4,374,974 already describes a process in which, starting from specific bisphenols, linear and cyclic oligo- and polyformals may be obtained after reaction with methylene chloride. A disadvantage of the materials which are to be obtained in this process is the relatively high content of cyclic reaction products, at several per cent, which has a very adverse effect on the mechanical properties. Furthermore, the polyformals described show very unfavorable swelling properties in organic solvents, as a result of which subsequent removal of the undesirable cyclic constituents is virtually impossible. Branched polyformals are not described in this specification.

DE A 27 38 962 and DE A 28 19 582 describe further and similar polyformals and their use as coatings or films, with the abovementioned disadvantages. Here also, the prior art teaches nothing of the preparation or use of branched polyformals or copolyformals.

EP A 0 277 627 describes polyformals based on specific bisphenols of the formula

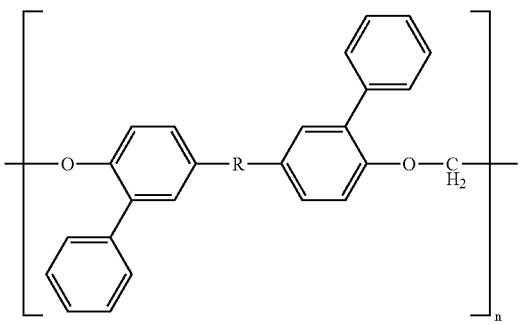

and the possible use thereof as materials for optical instruments. In this Application the substitution of the bisphenols on the aryl radicals is described as necessary in order to force the optical anisotropy of the polyformals into a range suitable for optical uses. However, nothing is said about branched polyformals.

The linear polyformals already described in the prior art and their preparation processes are unsatisfactory in respect of their preparation or have, inter alia because of a high content of cyclic by-products, unsatisfactory mechanical properties, which manifest themselves e.g. in an increased brittleness. No preparation process for branched polyformals or copolyformals is described in the prior art. The prior art teaches nothing about the positive rheological properties of long-chain branched polyformals in combination with outstanding resistances to hydrolysis.

There was therefore the object of providing high molecular weight, branched polyformals and copolyformals and processes for their preparation which avoid these disadvantages. This object is achieved, surprisingly, by the use of specific bisphenols, methylene chloride and a trifunctional compound as a unit in homo- or copolyformals, and by the branched polyformals and/or copolyformals—herein (co) polyformals—according to the invention which are to be obtained by this means, and their preparation processes.

It has also been found here that the water uptake of the polyformals obtained has lower values than polycarbonates. Due to the favorable solution or swelling properties of the materials, cyclic impurities obtained may be separated off almost quantitatively and are then present only in the same order of magnitude as in the polycarbonate types which are nowadays usual. An impairment of the mechanical properties by cyclic impurities may be virtually ruled out as a result. It has moreover been found, surprisingly, that by suitable copolymer compositions glass transition temperatures of 130–170° C. may be realized, these being necessary for industrial use.

It was not to be expected that a hydrolysis-stable material which, due to its long-chain branching, at the same time has all the advantages of a structurally viscous polymer, such as e.g. easier processing in the range of relatively high shear rates or melt stiffness in the range of lower shear rates, may be produced in this manner.

For complete acetals, as these polymers indeed are to be considered, these polyformals completely unexpectedly also show in fact an extreme hydrolytic stability at higher temperatures both in an alkaline and in an acid medium. It is moreover found that the polymers themselves are considerably more stable compared with polycarbonate in the boiling test in water.

DETAILED DESCRIPTION OF THE INVENTION

The invention therefore provides branched polyformals and copolyformals with structurally viscous properties, processes for their preparation and the use of branched polyformals and copolyformals and the use for the production of particular products. The polyformals and copolyformals according to the invention are based on aromatic bisphenols. They contain structural elements represented by at least one of the general formula (Ia) and (Ib)

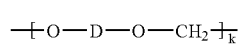
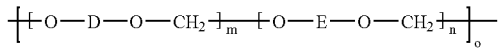

wherein the radicals O-D-O and O-E-O represent any diphenolate radicals, in which -E- and -D- independently of one another represent an aromatic radical having 6 to 40 C atoms, preferably 6 to 21 C atoms, which may contain one or more aromatic nuclei or fused aromatic nuclei and is optionally substituted by $C_1$–$C_{12}$-alkyl radicals, preferably by $C_1$–$C_8$-alkyl radicals, or halogen and may contain aliphatic radicals, aromatic nuclei or heteroatoms, preferably aliphatic radicals, as bridge members, wherein particularly preferably at least one of the radicals O-D-O and O-E-O represents the residue of 1,1-bis-(4-hydroxyphenyl)-3,3,5-trimethylcycloxane (bisphenol TMC) radical, and in which k represents an integer between 1 and 4,000, preferably between 2 and 2,000, particularly preferably between 2 and 1,000 and very particularly preferably between 2 and 500 and especially preferably between 2 and 300, o represents numbers between 1 and 4,000, preferably between 1 and 2,000, particularly preferably between 1 and 1,000 and very particularly preferably between 1 and 500 and especially preferably between 1 and 300, and m represents a fraction z/o and n represents a fraction (o-z)/o, wherein z represents numbers between 0 and o and some of the radicals O-D-O and O-E-O are replaced by a branching agent having three or more functional groups so that branching occurs.

Suitable branching agents are the tri- or polyfunctional compounds known in polycarbonate chemistry, in particular those having three or more phenolic OH groups, or compounds with at least 2 phenolic OH groups and an NH group.

Branching agents which are preferably suitable are, for example, isatin-biscresol (IBC), phloroglucinol, 4,6-dimethyl-2,4,6-tri-(hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenyl-isopropyl)-phenyl)-orthoterephthalic acid ester, tetra-(4-hydroxyphenyl)-methane, tetra-(4-(4-hydroxyphenyl-isopropyl)-phenoxy)-methane and 1,4-bis-(4',4"-dihydroxytriphenyl)-methyl)-benzene, as well as 2,4-dihydroxybenzoic acid, trimesic acid, cyanuric chloride and, for some uses, even preferably 3,3-bis-(3-methyl-4-hydroxyphenyl)-2-oxo-2,3-dihydroindole.

The amount of the branching agents to be employed is 0.01 mol % to 3 mol %, based on the moles of the particular diphenols employed. The amount of branching agent to be employed is preferably 0.01 to 2 mol %, particularly preferably 0.01 to 1 mol % and very particularly preferably 0.01 to 0.6 mol %.

Isatin-bisphenols, such as e.g. isatin-biscresol (EBC) and 1,1,1-tri-(4-hydroxyphenyl)-ethane (THPE), are particularly preferred as branching agents.

Isatin-biscresol is very particularly preferred as the branching agent, as a result of which very particularly preferred structural elements according to formula 2 result as the branching site in the polyformal or copolyformal:

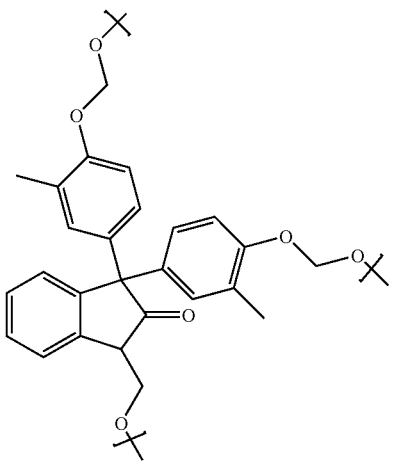

2

—O-D-O— and —O-E-O— thus independently of one another may particularly preferably represent a radical according to formula 2 derived from IBC as the branching agent.

Via the NH functionality of IBC, the third linking site then results at this site, which leads to the desired branching of the polymer main chain.

Preferred structural units of the branched polyformals or copolyformals according to the invention are derived from general structures of the formulae (2a) to (2d)

in which $R^1$ and $R^2$ independently of one another represent H, linear or branched $C_1$–$C_{18}$-alkyl or -alkoxy radicals, halogen, such as Cl or Br, or an optionally substituted aryl or aralkyl radical, preferably H or linear or branched $C_1$–$C_{12}$-alkyl radicals, particularly preferably H or $C_1$–$C_8$-alkyl radicals and very particularly preferably H or methyl, X represents a single bond, a $C_1$- to $C_6$-alkylene, $C_2$- to $C_5$-alkylidene or $C_5$- to $C_6$-cycloalkylidene radical, which may be substituted by $C_1$- to $C_6$-alkyl, preferably methyl or ethyl radicals, or a $C_6$- to $C_{12}$-arylene radical, which may optionally be fused with further aromatic rings containing heteroatoms, wherein p represents an integer between 1 and 4,000, preferably between 2 and 2,000, particularly preferably between 2 and 1,000 and very particularly preferably between 2 and 500 and especially between 2 and 300, r and q have the meaning as mentioned above for m and n and wherein some of the diphenols are replaced by at least one of the above mentioned branching agents.

The diphenolate radicals, where these are not branching sites, in the formulae (2a) to (2d) are particularly preferably derived from the suitable diphenols also mentioned below.

Examples which are mentioned for the diphenols on which the general formula (2) is based are hydroquinone, resorcinol, dihydroxybiphenyls, bis-(hydroxyphenyl)-alkanes, bis-(hydroxyphenyl)-cycloalkanes, bis-(hydroxyphenyl)sulfides, bis-(hydroxyphenyl)ethers, bis-(hydroxyphenyl)ketones, bis-(hydroxyphenyl)sulfones, bis-(hydroxyphenyl-sulfoxides, α,α'-bis-(hydroxyphenyl)-diisopropyl-benzenes and nucleus-alkylated and nucleus-halogenated compounds thereof, and also α,ω-bis-(hydroxyphenyl)-polysiloxanes.

Preferred diphenols are, for example, 4,4'-dihydroxybiphenyl (DOD), 4,4'-dihydroxybiphenyl ether (DOD ether), 2,2-bis-(4-hydroxyphenyl)-propane (bisphenol A), 1,1-bis-(4-hydroxyphenyl)-3,3,5-trimethylcyclohexane (bisphenol TMC), 1,1-bis-(4-hydroxyphenyl)-cyclohexane, 2,4-bis-(4-hydroxyphenyl)-2-methylbutane, 1,1-bis-(4-hydroxyphenyl)-1-phenylethane, 1,3-bis-[2-(4-hydroxyphenyl)-2-propyl]benzene (bisphenol M), 1,3-bis[2-(4-hydroxyphenyl)-2-propyl]-benzene(bisphenol M), 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-

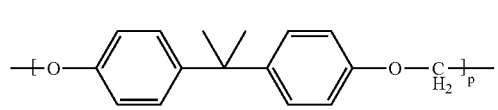

(2a)

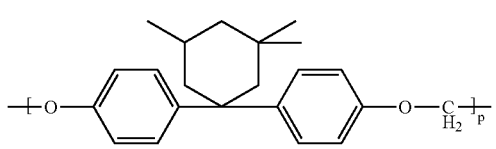

(2b)

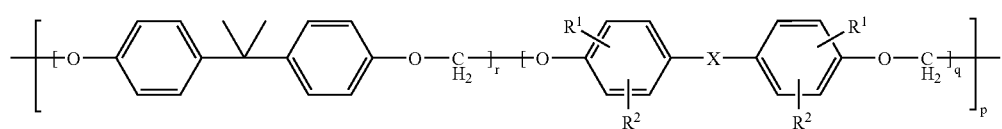

(2c)

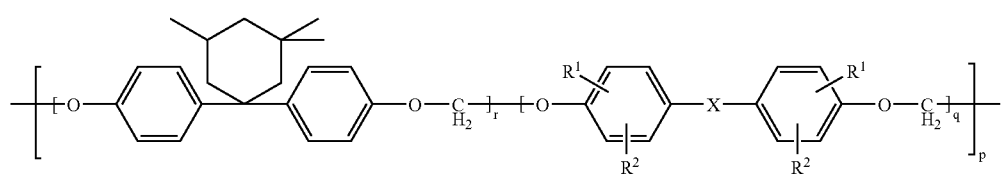

(2d)

hydroxyphenyl)-propane, bis-(3,5-dimethyl-4-hydroxyphenyl) sulfone, 2,4-bis-(3,5-dimethyl-4-hydroxyphenyl)-2-methylbutane, 2,2-bis-(3,5-dichloro-4-hydroxyphenyl)-propane and 2,2-bis-(3,5-dibromo-4-hydroxyphenyl)-propane.

Particularly preferred diphenols are, for example, 2,2-bis-(4-hydroxyphenyl)-propane(bisphenol A), 4,4'-dihydroxybiphenyl (DOD), 4,4'-dihydroxybiphenyl ether (DOD ether), 1,3-bis[2-(4-hydroxyphenyl)-2-propyl]-benzene(bisphenol M), 2,2-bis-(3,5-dimethyl-4-hydroxyphenyl)-propane, 1,1-bis-(4-hydroxyphenyl)-1-phenylethane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethylcyclohexane (bisphenol TMC).

2,2-Bis-(4-hydroxyphenyl)-propane(bisphenol A), 4,4'-dihydroxybiphenyl (DOD), 4,4'-dihydroxybiphenyl ether (DOD ether), 1,3-bis[2-(4-hydroxyphenyl)-2-propyl]-benzene(bisphenol M) and 1,1-bis-(4-hydroxyphenyl)-3,3,5-trimethylcyclohexane(bisphenol TMC) are very particularly preferred.

The diphenols may be used both by themselves and in a mixture with one another; both homopolyformals and copolyformals are included. The diphenols are known from the literature or may be prepared by processes known from the literature (see e.g. H. J. Buysch et al., Ullmann's Encyclopedia of Industrial Chemistry, VCH, New York 1991, 5th ed., vol. 19, p. 348).

The present invention relates to the use of branched, structurally viscous polyformals and copolyformals of the formula (2a) to (2d) for the preparation of components such as sheets, multi-wall sheets, twin-wall sheets, corrugated sheets or bottles, such as water or baby bottles, or containers for treatment of contaminated water, by means of various processes, such as extrusion, injection molding, extrusion blow molding or stretch blow molding.

The present invention also provides the branched polyformals and copolyformals of the formula (2a) to (2d) themselves.

The present invention furthermore provides a process for the preparation of branched polyformals and copolyformals of the formulae (2a) to (2d), characterized in that bisphenols, branching agents and chain terminators are reacted in a homogeneous solution of methylene chloride or α,α-dichlorotoluene and a suitable high-boiling solvent, such as, for example, N-methylpyrrolidone (NMP), dimethylformamide (DMF), dimethylsulfoxide (DMSO), N-methylcaprolactam (NMC), chlorobenzene, dichlorobenzene or tetrahydrofuran (THF), in the presence of a base, preferably sodium hydroxide or potassium hydroxide, at temperatures of between 30 and 80° C. Preferred high-boiling solvents are NMP, DMF, DMSO and NMC, particularly preferably NMP, NMC and DMSO and very particularly preferably NMP and NMC. The reaction may also be conducted in several stages. The cyclic impurities are separated off, after the organic phase has been washed neutral, by a precipitation process in or by a fractional kneading process of the crude product with a solvent which dissolves the cyclic compounds, e.g. acetone. The cyclic impurities dissolve virtually completely in the solvent and may be separated off almost completely by kneading in portions and changing the solvent. A content of cyclic compounds after kneading of significantly less than 1% may be achieved by the use of, for example, approx. 10 litres of acetone, which is added in, for example, 5 portions to an amount of polyformal of approx. 6 kg.

The cyclic polyformals and copolyformals may also be separated off by a precipitation process in suitable solvents which function as non-solvents for the desired polymer and as solvents for the undesirable cyclic compounds. These are preferably alcohols or ketones.

Bisphenols are to be understood as meaning the above-mentioned diphenols. Branching agents are to be understood as meaning the trifunctional and tetrafunctional compounds also mentioned above.

The reaction temperature is 30° C. to 160° C., preferably 40° C. to 100° C., particularly preferably 50° C. to 80° C. and very particularly preferably 60° C. to 80° C.

The weight average molecular weights Mw of the branched polyformals and copolyformals according to the invention are in the range from 600 to 1,000,000 g/mol, preferably between 600 and 500,000 g/mol, particularly preferably between 600 and 250,000 g/mol and very particularly preferably between 5000 and 120,000 g/mol and especially between 7000 and 80,000 g/mol and in particular 10,000 to 70,000 g/mol (determined by means of GPC and polycarbonate calibration).

Preferred, particularly preferred or very particularly preferred embodiments are those which use the parameters, compounds, definitions and explanations given under preferred, particularly preferred or very particularly preferred or preferably etc.

However, the definitions, parameters, compounds and explanations mentioned generally in the description or mentioned in preferred ranges may also be combined with one another as desired, that is to say between the particular ranges and preferred ranges.

The branched polyformals and copolyformals according to the invention may be worked up in a known manner and processed to any desired shaped articles, for example by extrusion, extrusion blow molding or injection molding. The components obtained in this way may also be provided with further layers (e.g. a coextrusion protective layer with UV protection).

Other polymers, such as, for example, aromatic polycarbonates and/or other aromatic polyester-carbonates and/or other aromatic polyesters, may also be admixed with the branched (co)polyformals according to the invention in a known manner.

The conventional additives for thermoplastics, such as fillers, UV stabilizers, heat stabilizers, antistatics and pigments, may also be added to the branched polyformals and copolyformals according to the invention in the conventional amounts; if appropriate, the mold release properties, the flow properties and/or the flame resistance may also be improved by addition of external mold release agents, flow agents and/or flameproofing agents (e.g. alkyl and aryl phosphites, phosphates,—phosphanes and low molecular weight carboxylic acid esters, halogen compounds, salts, chalk, quartz flour, glass fibers and carbon fibers, pigments and a combination thereof. Such compounds are described e.g. in WO 99/55772, p. 15–25, and in the corresponding chapters of the "Plastics Additives Handbook", ed. Hans Zweifel, 5th edition 2000, Hanser Publishers, Munich).

The branched (co)polyformals according to the invention, optionally in a blend with other thermoplastics and/or conventional additives, when processed to any desired shaped articles/extrudates, may be employed in all instances where polycarbonates, polyester-carbonates and polyesters which are already known are employed. On the basis of their profile of properties, they are suitable in particular as materials for extrusion processing for the production of articles for outdoor use or for extrusion blow molding for the production of bottle articles or components of complicated shape with several curves.

1. Safety panes, which as is known are necessary in many areas of buildings, vehicles and aircraft, and as helmet shields.
2. Production of foils, in particular ski foils.
3. Production of blow moldings (see, for example, U.S. Pat. No. 2,964,794), for example 1 to 5 gallon water bottles.
4. Production of transparent sheets, in particular hollow sheets, for example for covering buildings such as railway stations, greenhouses and lighting installations.
5. Production of optical data stores.
6. For the production of traffic light housings or traffic signs.
7. For the production of foams (see, for example, DE-B 1 031 507).
8. For the production of filaments and wires (see, for example, DE-B 1 137 167 and DE-A 1 785 137).
9. As translucent plastics with a content of glass fibers for illumination purposes (see, for example, DE-A 1 554 020).
10. As translucent plastics with a content of barium sulfate, titanium dioxide and/or zirconium oxide or organic polymeric acrylate rubbers (EP-A 634 445, EP-A 269324) for the production of transparent and light-scattering moldings.
11. For the production of precision injection molding components, such as, for example, lens holders. Polyformals with a content of glass fibers, which optionally additionally comprise about 1–10 wt. % $MoS_2$, based on the total weight, are used for this.
12. For the production of optical equipment components, in particular lenses for photographic and film cameras (see, for example, DE-A 2 701 173).
13. As light transmission carriers, in particular as light conductor cables (see, for example, EP-A 0 089 801).
14. As electrical insulating materials for electrical conductors and for plug housings and plug connectors.
15. Production of mobile telephone housings with improved resistance to perfume, shaving lotion and skin perspiration.
16. Network interface devices.
17. As a carrier material for organic photoconductors.
18. For the production of lamps, e.g. searchlight lamps, as so-called "head-lamps", diffusing screens or internal lenses.
19. For medical uses, e.g. oxygenators, dialysers.
20. For foodstuffs uses, such as e.g. bottles, utensils and chocolate molds.
21. For uses in the automobile sector where contact with fuels and lubricants may occur, such as, for example, bumpers, optionally in the form of suitable blends with ABS or suitable rubbers.
22. For sports articles, such as e.g. slalom poles or ski boot buckles.
23. For household articles, such as e.g. kitchen sinks and letterbox housings.
24. For housings, e.g. electrical distribution cabinets.
25. Housings for electric toothbrushes and hairdryer housings.
26. Transparent washing machine portholes with improved resistance to the wash solution.
27. Safety glasses, optical corrective glasses.
28. Lamp covers for kitchen equipment with improved resistance to kitchen vapour, in particular oil vapours.
29. Packaging film for medicaments.
30. Chip boxes and chip carriers.
31. For other uses, such as e.g. fattening stall doors or animal cages.
32. Containers for treatment/purification of contaminated water.

This Application also provides the shaped articles and optical data stores produced from the polymers according to the invention.

The following examples are intended to illustrate the invention, but without limiting it.

EXAMPLES

Comparison Example 1

Linear homopolyformal from bisphenol A:

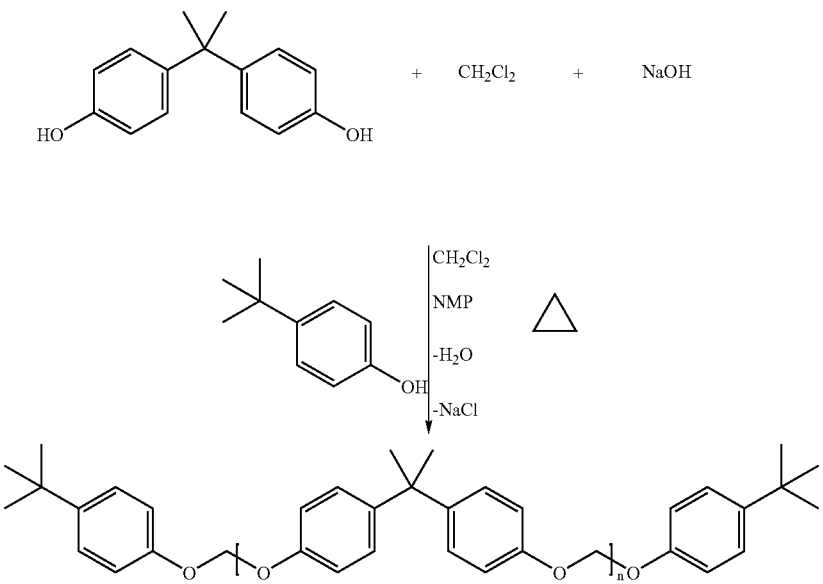

7 kg (30.66 mol) bisphenol A (Bayer AG), 3.066 kg (76.65 mol) sodium hydroxide lozenges and 69.4 g (0.462 mol) of finely ground p-tert-butylphenol (Aldrich) in 500 ml methylene chloride are added to a solvent mixture of 28.7 kg methylene chloride and 40.18 kg N-methyl-2-pyrrolidone (NMP), while stirring and under nitrogen as an inert gas. After homogenization, the mixture is heated to the reflux temperature (78° C.) and stirred at this temperature for one hour. After cooling down to 25° C., the reaction mixture is diluted with 20 l methylene chloride and 20 l demineralized water. The mixture is washed neutral and salt-free (conductivity<15 $\mu S.cm^{-1}$) with water in a separator. The organic phase from the separator is separated off and the solvent exchange of methylene chloride against chlorobenzene is carried out in an evaporating tank. The material is then extruded via a ZSK 32 devolatilization extruder at a temperature of 200° C. with final granulation. The synthesis procedure described and the extrusion for isolation of the polymer is carried out 2 times completely in order to arrive at a total amount of somewhat over 10 kg of material. After discarding first runnings material, a total of 11.99 kg polyformal are obtained as transparent granules by this means.

Analysis:
Molecular weight Mw=31,732, Mn=3,465 according to GPC (calibration against polycarbonate). The cyclic compounds were not separated off here. Swelling of the material with acetone is not possible, which means that it is also not possible to separate off the cyclic compounds.
Glass transition temperature Tg=89° C.
Relative solution viscosity in methylene chloride (0.5 g/100 ml solution)=1.237/1.238

Comparison Example 2

Synthesis of a linear copolyformal from bisphenol TMC and bisphenol A:

5.432 kg (17.5 mol) bisphenol TMC (x=70 mol %), 1.712 kg (7.5 mol) bisphenol A (y=30 mol %), 2.5 kg (62.5 mol) sodium hydroxide lozenges and 56.33 g (0.375 mol, 1.5 mol % with respect to bisphenol) of finely ground p-tert-butylphenol (Aldrich) in 500 ml methylene chloride are added to a solvent mixture of 28.7 kg methylene chloride and 40.18 kg N-methyl-2-pyrrolidone (NMP), while stirring and under nitrogen as an inert gas. After homogenization, the mixture is heated to the reflux temperature (78° C.) and stirred at this temperature for one hour. After cooling down to 25° C., the reaction mixture is diluted with 35 l methylene chloride and 20 l demineralized water. The mixture is washed neutral and salt-free (conductivity<15 $\mu S.cm^{-1}$) with water in a separator. The organic phase from the separator is separated off and the solvent exchange of methylene chloride against chlorobenzene is carried out in an evaporating tank. The material is then extruded via a ZSK 32 devolatilization extruder at a temperature of 280° C. with final granulation. After discarding first runnings material, a total of 5.17 kg copolyformal are obtained as transparent granules by this means. This still contains low molecular weight ring compounds as an impurity. The material is swollen with approx. 5 l acetone overnight. The mass obtained is kneaded with several portions of fresh acetone until ring compounds may no longer be detected. The purified material is dissolved in chlorobenzene and extruded again at 280° C. via the devolatilization extruder. After discarding first runnings material, the polyformal free from cyclic compounds is obtained as transparent granules by this means.

Analysis:
Molecular weight Mw=36,960, Mn=18,815, D=1.96 according to GPC (calibration against polycarbonate).
Glass transition temperature Tg=147° C.
Relative solution viscosity in methylene chloride (0.5 g/100 ml solution)=1.244/1.244

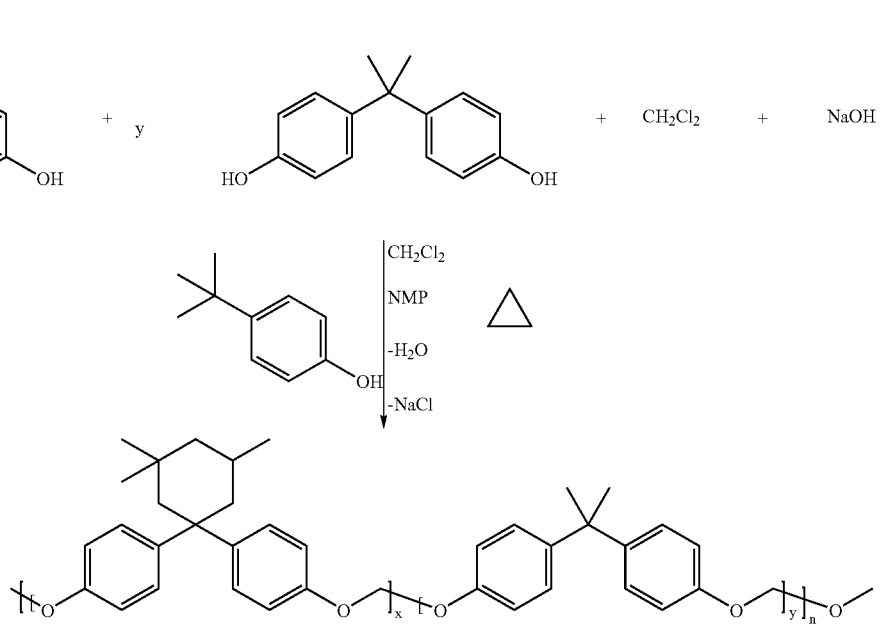

Example 1

Long-chain branched homopolyformal from bisphenol A:

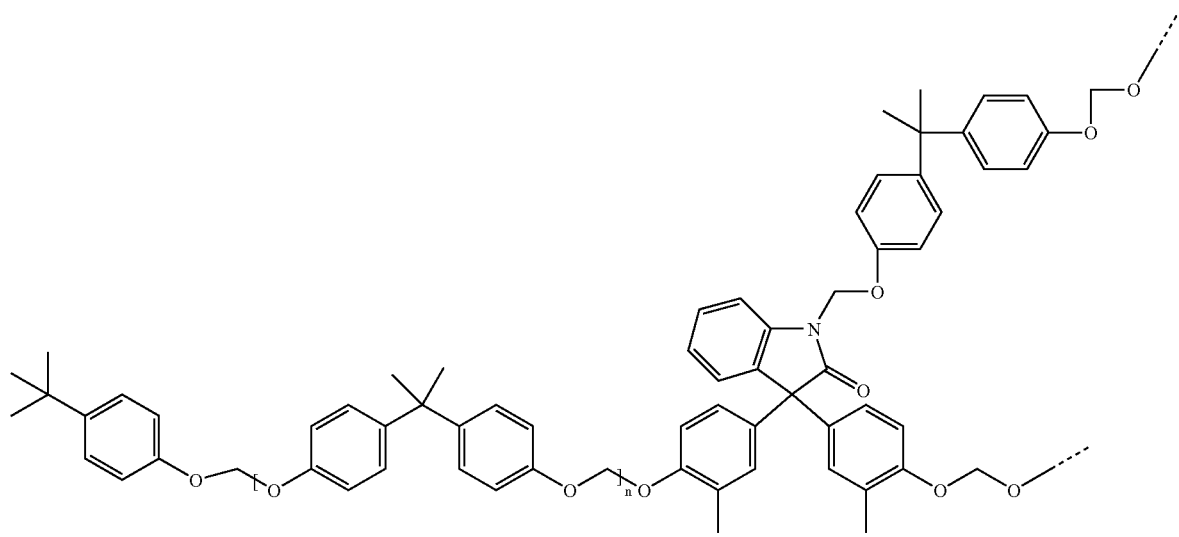

31.96 g (0.14 mol) bisphenol A (Bayer AG), 14.0 g (0.35 mol) sodium hydroxide lozenges, 0.21 g (0.0014 mol, 1 mol % with respect to bisphenol) of finely ground p-tert-butylphenol (Aldrich) and 0.193 g (0.00056 mol, 0.4 mol % with respect to bisphenol) isatin-biscresol (IBC) are added to a solvent mixture of 125 ml methylene chloride and 225 ml N-methyl-2-pyrrolidone (NMP), while stirring and under nitrogen as an inert gas. After homogenization, the mixture is heated to the reflux temperature (78° C.) and stirred at this temperature for one hour. After cooling down to 25° C., the reaction mixture is diluted with methylene chloride and demineralized water. The organic phase is then washed neutral and salt-free (conductivity<15 μS.cm$^{-1}$) with water. The polymer is finally precipitated in methanol. After rinsing with methanol and drying in a vacuum drying cabinet at 80° C., 29.2 g of white polyformal are obtained. The polymer, which still contains cyclic compounds, is then treated with some acetone and dried. The yield of branched material free from cyclic compounds is 22.3 g of a wool-white polymer.

Analysis:

Molecular weight Mw=30,589, Mn=9,015 according to GPC (calibration against polycarbonate).

Relative solution viscosity in methylene chloride (0.5 g/100 ml solution)=1.224/1.220

Example 2

Long-chain branched copolyformal from bisphenol A and bisphenol TMC:

5.432 kg (17.5 mol) bisphenol TMC (x=70 mol %), 1.712 kg (7.5 mol) bisphenol A (y=30 mol %, 2.5 kg (62.5 mol) sodium hydroxide lozenges, 56.33 g (0.375 mol, 1.5 mol % with respect to bisphenol) of finely ground p-tert-butylphenol (Aldrich) in 500 ml methylene chloride and 43.175 g (0.125 mol, 0.5 mol % with respect to bisphenol) isatin-biscresol (IBC) are added to a solvent mixture of 28.7 kg methylene chloride and 40.18 kg N-methyl-2-pyrrolidone (NMP), while stirring and under nitrogen as an inert gas. After homogenization, the mixture is heated to the reflux temperature (78° C.) and stirred at this temperature for one hour. After cooling down to 25° C., the reaction mixture is diluted with methylene chloride and demineralized water. The mixture is washed neutral and salt-free (conductivity<15 μS.cm$^{-1}$) with water in a separator. The organic phase from the separator is separated off and the solvent exchange of methylene chloride against chlorobenzene is carried out in an evaporating tank. The material is then extruded via a ZSK 32 devolatilization extruder at a temperature of 260° C. with final granulation. After discarding first runnings material, the copolyformal is obtained as transparent granules by this means. This still contains low molecular weight ring compounds as an impurity. The material is swollen with approx. 5 l acetone overnight. The mass obtained is kneaded with several portions of fresh acetone until ring compounds may no longer be detected. The purified material is dissolved in chlorobenzene and extruded again at 260° C. via the devolatilization extruder. After discarding first runnings material, the polyformal free from cyclic compounds is obtained as transparent granules by this means.

Analysis:

Molecular weight Mw=42,687, Mn=19,784, D=2.16 according to GPC (calibration against polycarbonate).

Example 3

Long-chain branched copolyformals from bisphenol A and bisphenol TMC:

Further branched copolyformals are prepared analogously to example 2. They differ only in the amount of branching agent IBC employed:

Analysis:

a) Amount of IBC (0.6 mol %):

Molecular weight Mw=42,796, Mn=20,075 according to GPC (calibration against polycarbonate).

b) Amount of IBC (0.7 mol %):

Molecular weight Mw=43,603, Mn=20,098 according to GPC (calibration against polycarbonate).

Properties of the Polymers:

Determination of the viscosity as a function of the shear rate (ISO 11443) on the long-chain branched polymer sample from example 2:

The branched copolyformal obtained in example 2 is analysed rheologically at 260, 280 and 300° C. The capillary (D/L) here is 20. The following data are obtained in this analysis:

| Shear gradient [s$^{-1}$] | Viscosity/ 260° C. [Pas] | 280° C. [Pas] | 300° C. [Pas] |
| --- | --- | --- | --- |
| 50 | 4,616 | 2,339 | 1,358 |
| 100 | 3,209 | 1,743 | 1,058 |
| 200 | 2,120 | 1,247 | 796 |
| 500 | 1,159 | 739 | 505 |
| 1,000 | 704 | 469 | 346 |

-continued

| Shear gradient [s$^{-1}$] | Viscosity/ 260° C. [Pas] | 280° C. [Pas] | 300° C. [Pas] |
| --- | --- | --- | --- |
| 1,500 | 521 | 359 | 268 |
| 5,000 | 246 | 152 | 117 |

Determination of the viscosity as a function of the shear rate (ISO 11443) on the linear polymer sample from comparison example 2:

The linear copolyformal obtained in comparison example 2 is analysed Theologically at 260, 280 and 300° C. The capillary (D/L) here is 20. The following data are obtained in this analysis:

| Shear gradient [s$^{-1}$] | Viscosity/ 260° C. [Pas] | 280° C. [Pas] | 300° C. [Pas] |
| --- | --- | --- | --- |
| 50 | 3,464 | 1,693 | 898 |
| 100 | 2,568 | 1,406 | 806 |
| 200 | 1,758 | 1,074 | 671 |
| 500 | 961 | 651 | 458 |
| 1,000 | 587 | 415 | 311 |
| 1,500 | 445 | 314 | 241 |
| 5,000 | 182 | 130 | 103 |

As may be seen from the comparison of the viscosity data between example 5 and 6, the shear viscosity increases significantly at lower shear rates on the sample from example 2 compared with the sample from comparison example 2.

Determination of the viscosity as a function of the shear rate (ISO 11443) on the long-chain branched polymer sample from example 3a):

The branched copolyformal obtained in example 3a) is analysed rheologically at 260, 280 and 300° C. The capillary (D/L) here is 20. The following data are obtained in this analysis:

| Shear gradient [s$^{-1}$] | Viscosity/ 260° C. [Pas] | 280° C. [Pas] | 300° C. [Pas] |
| --- | --- | --- | --- |
| 50 | 4,362 | 2,517 | 1,492 |
| 100 | 3,085 | 1,836 | 1,144 |
| 200 | 2,136 | 1,306 | 845 |
| 500 | 1,208 | 777 | 530 |
| 1,000 | 753 | 501 | 358 |
| 1,500 | 560 | 379 | 274 |
| 5,000 | — | 154 | 120 |

Determination of the viscosity as a function of the shear rate (ISO 11443) on the long-chain branched polymer sample from example 3b):

The branched copolyformal obtained in example 3b) is analysed Theologically at 260, 280 and 300° C. The capillary (D/L) here is 20. The following data are obtained in this analysis:

| Shear gradient [s$^{-1}$] | Viscosity/ 260° C. [Pas] | 280° C. [Pas] | 300° C. [Pas] |
| --- | --- | --- | --- |
| 50 | 4,476 | 2,499 | 1,574 |
| 100 | 3,150 | 1,791 | 1,188 |

-continued

| Shear gradient [$s^{-1}$] | Viscosity/ 260° C. [Pas] | 280° C. [Pas] | 300° C. [Pas] |
|---|---|---|---|
| 200 | 2,147 | 1,282 | 870 |
| 500 | 1,195 | 764 | 545 |
| 1,000 | 740 | 500 | 366 |
| 1,500 | 551 | 381 | 283 |
| 5,000 | — | 156 | 122 |

MV index as characterization of the long-chain branching at 280 and 300° C.

The MV index was used to characterize the branching of the polyformals. The MV index is defined as the quotient of the melt viscosities at a shear rate of 50 $s^{-1}$ and $5\times 10^3$ $s^{-1}$. The higher the MV index the greater the deviation from Newtonian fluid behaviour, i.e. the greater the structural viscosity.

| Polyformal from example | Visc./shear rate 50 $s^{-1}$ | $5 \times 10^3$ $s^{-1}$ | MV index |
|---|---|---|---|
| a) Temperature 280° C.: | | | |
| 2 | 2,339 | 152 | 15.39 |
| Comparison example 2 | 1,693 | 130 | 13.02 |
| 3a | 2,517 | 154 | 16.34 |
| 3b | 2,499 | 156 | 6.02 |
| b) Temperature 300° C. | | | |
| 2 | 1,358 | 117 | 11.61 |
| Comparison example 2 | 898 | 103 | 8.72 |
| 3a | 1,492 | 120 | 12.43 |
| 3b | 1,574 | 122 | 12.90 |

MV index as characterization of the long-chain branching at 260 and 300° C.

A slightly differently defined MV index may be used to characterize the branching of the polyformals. This MV index is defined as the quotient of the melt viscosities at a shear rate of 50 $s^{-1}$ and $10^3$ $s^{-1}$. The higher the MV index the greater the deviation from Newtonian fluid behaviour, i.e. the greater the structural viscosity.

| Polyformal from example | Visc./shear rate 50 $s^{-1}$ | $10^3$ $s^{-1}$ | MV index |
|---|---|---|---|
| a) Temperature 260° C.: | | | |
| 2 | 4,616 | 704 | 6.56 |
| Comparison example 2 | 3,464 | 1,693 | 2.04 |
| 3a | 4,362 | 753 | 5.80 |
| 3b | 4,476 | 740 | 6.04 |
| b) Temperature 300° C. | | | |
| 2 | 1,358 | 311 | 3.92 |
| Comparison example 2 | 898 | 358 | 2.89 |
| 3a | 1,492 | 1,492 | 4.16 |
| 3b | 1,574 | 1,574 | 4.30 |

As may be seen from the MV index determined, the polymer samples from example 2, 3a and 3b are unambiguously structurally viscous materials. In comparison with the MV index of the linear sample from comparison example 2, the MV indices of the branched materials are significantly higher.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A branched (co)polyformal containing structural units conforming to at least one general formulae (1a) and (1b)

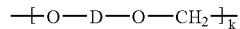

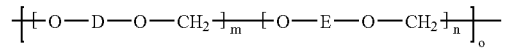

wherein each of -E- and -D- independently of one another denote an aromatic radical having 6 to 40 C atoms, k is 1 to 4,000, o is 1 to 4,000, m is z/o and n is (o-z)/o, where z is 0 to o and at least one residue of a trifunctional or polyfunctional branching agent.

2. The branched (co)polyformal according to claim 1, wherein at least one of O-D-O and O-E-O is the structural residue of 1,1-bis-(4-hydroxyphenyl)-3,3,5-trimethylcyclohexane.

3. Branched polyformals and copolyformals according to claim 1, characterized in that at least one of —O-D-O— and —O-E-O— represent the structural residue of

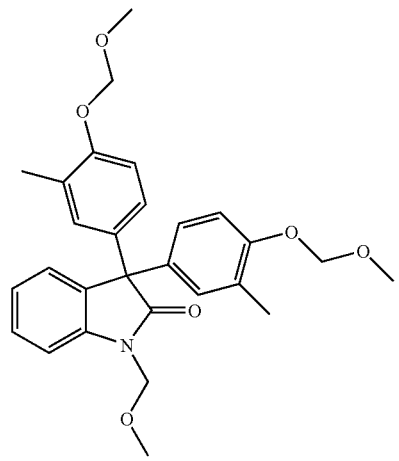

4. A molded article comprising the (co)polyformal according to claim 1.

5. An optical data storage medium comprising the (co)polyformal according to claim 1.

6. A process for the preparation of the branched (co)polyformal according to claim 1 comprising reacting at least one bisphenol and at least one branching agent with methylene chloride or α,α-dichlorotoluene in a homogeneous solution in a high-boiling solvent in the presence of a base at temperatures of between 30 and 160° C.

7. The process according to claim 6, further comprising separating off cyclic impurities by precipitation or kneading the (co)polyformal with acetone.

8. The branched (co)polyformal of claim 1 wherein said branching agent is a member selected from the group consisting of isatin-biscresol, phloroglucinol, 4,6-dimethyl-2,4,6-tri-(hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4- hydroxyphenyl)-phenyl methane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenyl-isopropyl)-phenyl)-orthoterephthalic acid ester, tetra-(4-hydroxyphenyl)-methane, tetra-(4-(4-hydroxyphenyl-isopropyl)-phenoxy)-methane, 1,4-bis-(4',4"-dihydroxytriphenyl)-methyl)-benzene, 2,4-dihydroxybenzoic acid, trimesic acid, cyanuric chloride and 3,3-bis-(3-methyl-4-hydroxyphenyl)-2-oxo-2,3-dihydroindole.

9. The branched (co)polyformal of claim 8 wherein said branching agent is a member selected from the group consisting of isatin-biscresol and 1,1,1-tri-(4-hydroxyphenyl)-ethane.

* * * * *